(No Model.)

2 Sheets—Sheet 1.

A. P. WEBBER.
CULTIVATOR.

No. 257,257. Patented May 2, 1882.

Witnesses:
A. W. Bond
B. A. Price

Inventor
Alanson P. Webber
By West & Bond Attys (No Model.) 2 Sheets—Sheet 2.

A. P. WEBBER.
CULTIVATOR.

No. 257,257. Patented May 2, 1882.

Witnesses:

Inventor:
Alanson P. Webber
By West & Bond, Attys

UNITED STATES PATENT OFFICE.

ALANSON P. WEBBER, OF SARATOGA, ILLINOIS.

CULTIVATOR.

SPECIFICATION forming part of Letters Patent No. 257,257, dated May 2, 1882.

Application filed March 19, 1880. (No model.)

*To all whom it may concern:*

Be it known that I, ALANSON P. WEBBER, residing at Saratoga, in the county of Marshall and State of Illinois, and a citizen of the United States, have invented a new and useful Improvement in Cultivators, of which the following is a full description, reference being had to the accompanying drawings, in which—

Figure 1:
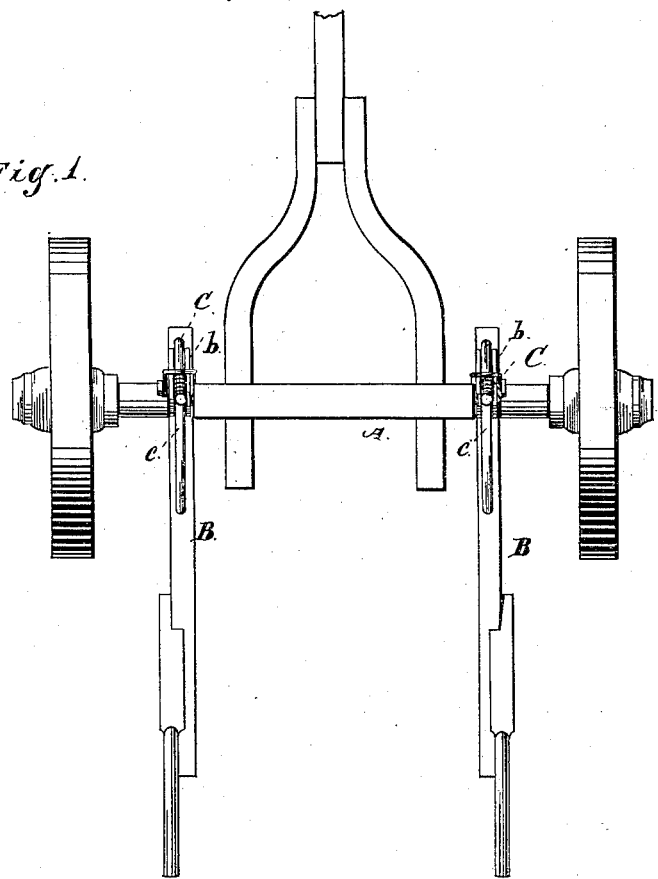
Figure 2:
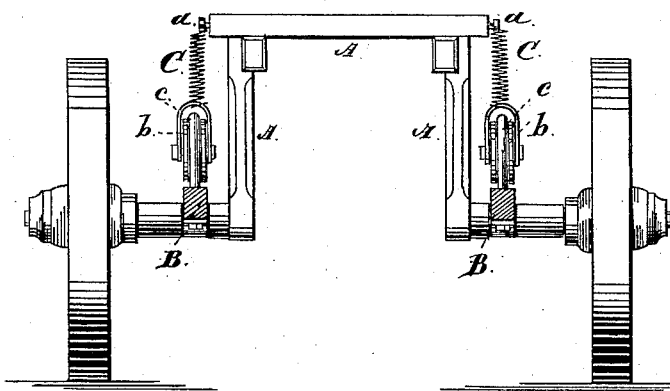
Figure 3:
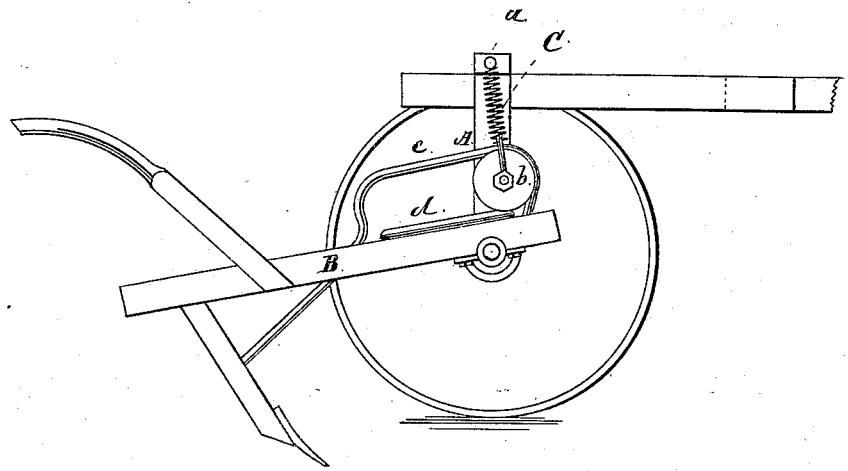
Figure 4:
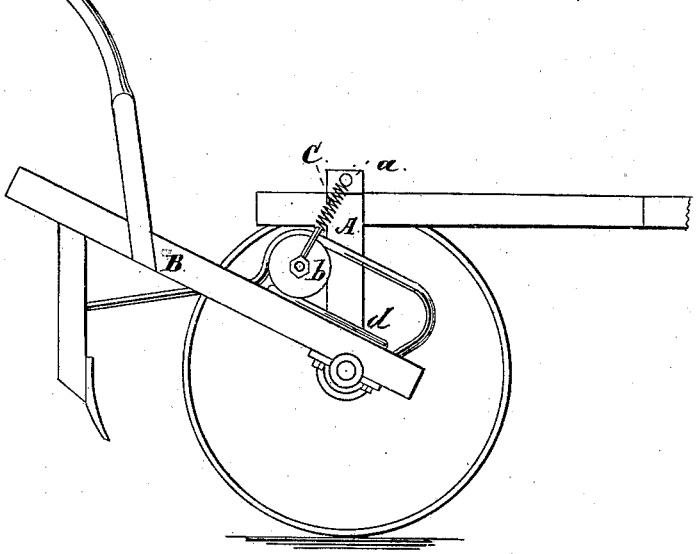

Figure 1 is a plan; Fig. 2, a section at line $x$ of Fig. 1. Fig. 3 is a side elevation with one wheel removed, showing the shovels in the ground. Fig. 4 is a side elevation with one wheel removed, showing the shovel-beam supported with the shovels out of the ground.

It has become common to use springs in cultivators for the purpose of partially supporting the plow-beams when in use, the tendency of such springs being to elevate the beams; hence, if the operator wishes to press the beams downward to plow deeper, he has to overcome the tension of the springs.

The object of my invention is to provide cultivators with springs connected with the beams, which springs will be free to act at all times, but which, when the shovels are in the ground, will not operate so as to have a tendency to elevate the rear ends of the beams, but when the rear ends of the beams are raised a little will come into action and will raise and hold or assist in raising and holding the shovels out of the ground. A further object is to so arrange the springs that if desired they can also be used for the purpose of aiding in holding the shovels in the ground. These objects I accomplish by means of coil-springs—one for each beam—the upper end of each spring being secured to the main frame, and the lower end being provided with a pulley which travels longitudinally under and along a rod or track connected at the ends to the beam, as hereinafter more fully set forth.

In the drawings I have represented a walking-cultivator having an arched or bent axle. A represents such axle.

B are the shovel-beams, which are to be connected to the horizontal parts of the axle, or to other suitable part of the cultivator in any desired manner, permitting the usual vertical and lateral movements of the beams. I have shown only one shovel on each beam; but two may be used.

C are coiled springs, to be made of suitable material and strength. The upper end of each spring is attached to some part of the frame or axle, as shown at $a$.

$b\ b$ are pulleys or rollers suitably connected with the lower ends of the springs.

$c\ c$ are rods, formed substantially as shown, the ends of which are secured to the plow-beams. As shown, the front end of each rod $c$ is secured to its respective beam a little forward of the joint, by which the beam is connected with the axle; but this is not necessary for the purpose of securing the leading object of the invention. These rods $c\ c$ pass over the pulleys $b\ b$, and are so arranged that there is room for the pulleys between the beams and the rods, which rods serve the purpose of tracks, upon which the pulleys can run.

$d\ d$ are round or half-round pieces of metal secured to the upper sides of the beams directly beneath the rods or tracks $c\ c$. They serve, when used, as guides for the pulleys; but I think that they may be omitted without impairing the efficiency of my devices. I arrange the springs so that when in the position shown in Fig. 3 they will be under some tension, and make them strong enough to sustain the beams in the position shown in Fig. 4.

As shown in Fig. 3 the shovels are supposed to be in the ground, and the centers of the pulleys are a little forward of the joints of the beams; and if the springs are under tension the tendency will be to lift the forward ends of the beams, and hence to hold the shovels in the ground. If the rear ends of the beams be raised a little, the front ends of the rods $c$ will be carried forward and down and the centers of the pulleys will be brought back of the beam-joints; and then the action of the springs will have a tendency to raise the rear ends of the beams, and, this operation being continued, the pulley will travel along the rods $c$ until the several parts are brought to the position shown in Fig. 4, when the beams will be sustained by the action of the springs alone. The higher the beams are raised the more do the springs relieve the operator.

The parts can easily be brought back from the position shown in Fig. 4 to that shown in Fig. 3 by bearing down on the plow-handles.

If the forward ends of the rods be placed a little farther back than shown, the springs would not in any position operate to hold the shovels in the ground. If the parts should be so arranged that the centers of the pulleys will always be a little back of the beam-joints, the springs will always have a tendency to raise the shovels out of the ground, which I do not consider desirable; but when so arranged the springs will travel along the rods $c$ when the rear ends of the beams are raised, and will hold the beams up the same as before, and I claim this modification.

What I claim as new, and desire to secure by Letters Patent, is as follows:

The combination, in a cultivator, of the axle with the swinging shovel-beams B, the springs secured at their upper ends to the axle and at their lower ends provided with pulleys or rollers, and the rods $c$, secured to the shovel-beams and passing over the said rollers, said members being constructed and adapted for operation substantially as described.

ALANSON P. WEBBER.

Witnesses:
GEORGE SCHOLES,
ROBERT MCDONOUGH.